July 28, 1931. J. H. HOLLOWAY 1,816,532
INDICATING AND RECORDING INSTRUMENT FOR TESTING PISTON RINGS AND THE LIKE
Filed Aug. 5, 1927 2 Sheets-Sheet 1
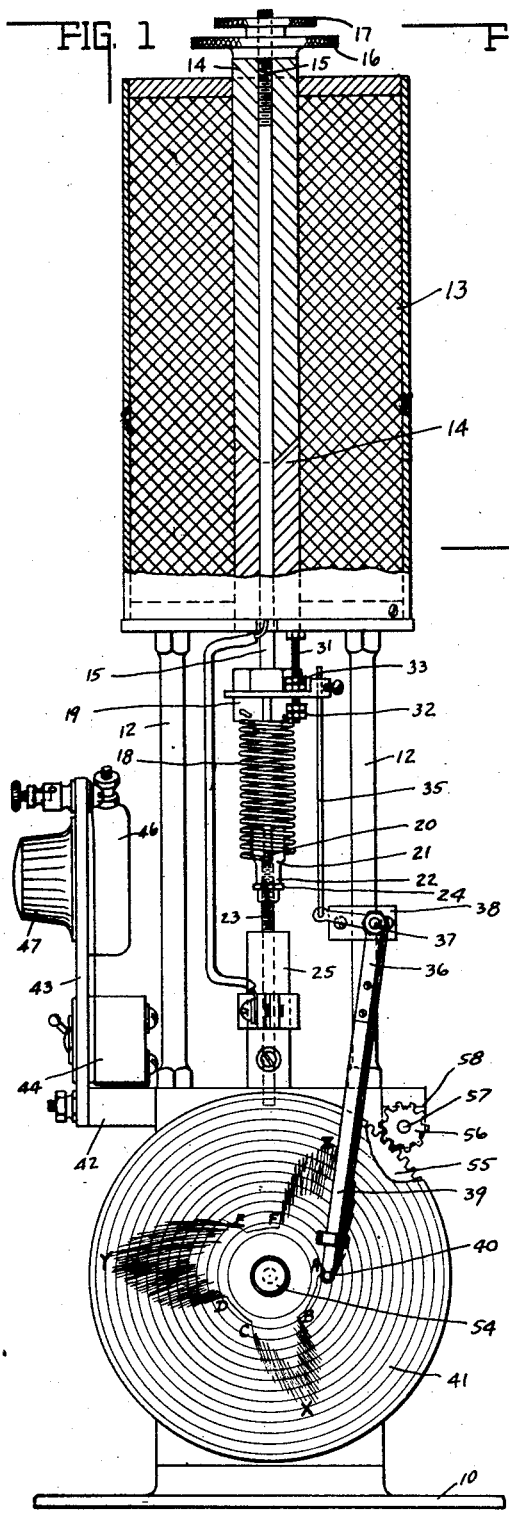
INVENTOR.
JOHN H. HOLLOWAY.
BY
ATTORNEYS.

July 28, 1931. J. H. HOLLOWAY 1,816,532
INDICATING AND RECORDING INSTRUMENT FOR TESTING PISTON RINGS AND THE LIKE
Filed Aug. 5, 1927  2 Sheets-Sheet 2
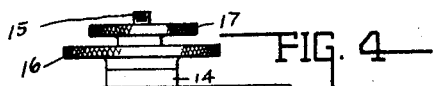
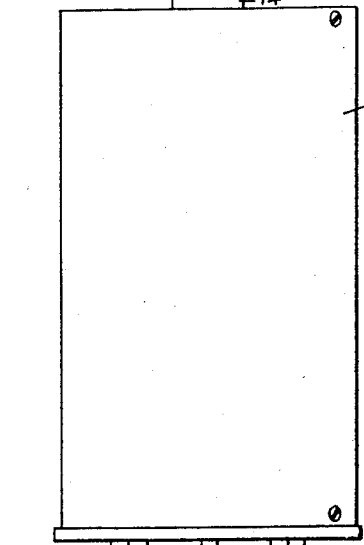
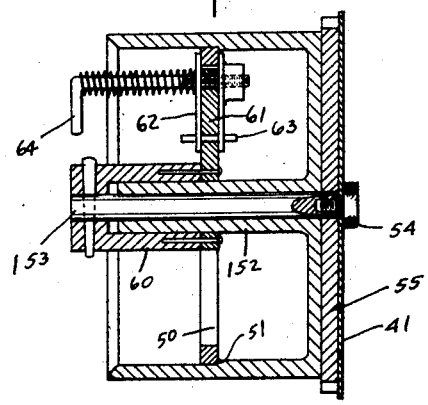
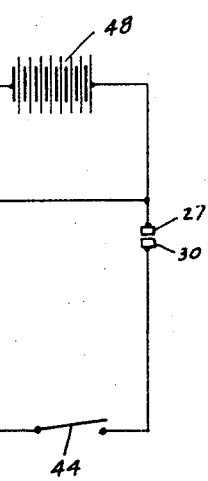
INVENTOR.
JOHN H. HOLLOWAY.
BY *[signature]*
ATTORNEYS.

Patented July 28, 1931

1,816,532

UNITED STATES PATENT OFFICE

JOHN H. HOLLOWAY, OF LAFAYETTE, INDIANA

INDICATING AND RECORDING INSTRUMENT FOR TESTING PISTON RINGS AND THE LIKE

Application filed August 5, 1927. Serial No. 210,853.

This invention relates to an instrument for measuring or indicating variations in surface contact, curvature or thickness of an object, as well as measuring or indicating the spring tension or radial force exerted thereby, and developing a diagram or chart for visually indicating the same.

The invention is particularly applicable to the scientific testing of piston rings with respect to cylinder contact and spring tension or outward radial force exerted against a cylinder wall. However, it will be appreciated and understood that it is equally applicable for the measurement of other articles or objects for graphically or otherwise indicating any variation in curvature, such as the variation in curvature of a piston or cylinder, or the spring tension, such as the spring tension exerted by a flat, spiral or cylindrical spring throughout its length. It is also adaptable to indicate the variation in thickness of a strip of metal, or the spring tension or force exerted thereby.

One feature of the invention resides in its application to a piston ring whereby it will graphically chart or develop a diagram visually indicating any extent of surface about the periphery of the ring which does not have the proper cylinder contact or comprises a so-called "flat", while at the same time similarly charting the variation in spring tension of the ring, or in other words, the outward radial force which would be exerted thereby against a cylinder wall. This is not only quickly and easily accomplished by merely placing a piston ring in the instrument and rotating the same one revolution, but the graphic chart produced thereby actually measures such variations and gives a clear visual illustration thereof as applied to the corresponding portions of the piston ring. Thus, a piston ring may be tested and a permanent record made of such arcs in the ring as may have improper curvature or contact, or fail to exert the proper radial force.

The full nature of the invention will be understood from the accompanying drawings and the following description and claims:

In the drawings, Figure 1 is a front elevation of the instrument showing a solenoid in cross section. Fig. 2 is a rear elevation of the lower portion of the instrument. Fig. 3 is a side elevation with the upper portion removed. Fig. 4 is a side elevation showing the opposite side from Fig. 3 with a portion thereof in section. Fig. 5 is a section taken on the line 5—5 of Fig. 3. Fig. 6 is a wiring diagram.

In the drawings there is shown an instrument having a base 10 provided with a cylinder housing 11 mounted thereon having its axial center positioned horizontally. Supported above the housing there is a plurality of supporting posts 12 upon the upper end of which there is securely mounted a solenoid or electro-magnet 13. The electro-magnet is provided with the usual floating core 14 which is screwed upon a rod 15 extending centrally therethrough and protruding from the top and bottom ends thereof. The electro-magnet is iron clad of the tractive type. On the top of said rod there is an adjusting nut 16 screw threaded thereon with a lock nut 17 mounted thereabove. The lower end of the rod 15 is secured to the top of a calibrated spring 18 depending vertically from the lower end of said rod. Said rod and spring are securely locked together by the lock nuts 19. The lower end of the calibrated spring is provided with a ball 20 mounted in the socket 21 of the connecting member 22 which is adjustably secured upon the end of a loading bar 23 by means of the adjusting and lock nuts 24. The loading bar 23 extends through a suitable bearing 25 and is slidable vertically therein, said bearing being rigidly cast or otherwise mounted upon the top of the cylinder housing 11 in the form of a boss or the like. The lower end of the loading bar 23 is adjusted to extend under normal conditions through an opening in the top of the cylinder 11 and very slightly below the inner surface thereof.

Rigidly mounted on the boss or bearing 25, there is a support 26 for an adjustable contact point 27. Extending through a suitable opening in said boss and rigidly connected to the loading rod 23 by a screw 28, there is a support 29 having a contact point 30 thereon in position to make contact with the point 27.

Depending from the support of the electro-magnet there is a screw-threaded rod 31 having adjustable and locking stop nuts 32 and 33 positioned thereon in spaced relation. Secured between the nuts 19 which connect the lower end of the rod 15 with the upper end of the spring 18, there is a horizontally-extending bar 34 which embraces the rod 31 between the stops 32 and 33 so as to be movable intermediate thereof, said stops being adapted to limit its vertical movement to a predetermined extent.

Adjustably connected with the cross bar and extending downwardly therefrom, there is a link 35 which is connected at its lower end with a bell crank lever 36 fulcrumed at 37 to a supporting block 38 adjustably secured on one of the supporting rods 12. The other end of the bell crank 36 is secured to an arm 39 which is provided on its lower end with a pen 40 in position to trace a graphic line on the chart 41.

Mounted on the protruding support 42 formed on the top of the cylinder 11, there is an instrument board 43 having mounted thereon the switches 44 and 45 and the rheostat 46 provided with an exposed dial 47.

As shown in the wiring diagram in Fig. 6, there is a source of current indicated at 48 which has one terminal connected with the switch 45, which in turn is connected with the electro-magnet 13. The other terminal of the electro-magnet is connected in parallel with the resistance 46 and the contact point switch 44. The other post of the resistance coil 46 is connected with the battery 48 and the upper contact point 47.

Removably mounted in the cylinder 11 there is a piston ring 50 to be tested. The circumference of the cylinder 11 is the same as the circumference of the cylinder in which the piston ring 50 is adapted to be commercially used. The interior of said cylinder is provided with an annular internal shoulder 51 against which the ring is adapted to abut when mounted in position therein. Before the ring is placed in the cylinder, a boss 52 is clamped thereon by means of a screw 53, but in such fashion as not to interfere with the rotation of the ring within the cylinder. One end of the cylinder is closed and is provided with a bearing 152 extending inwardly therefrom through which the spindle 153 extends having its outer end screw-threaded to receive the screw 54, and having keyed thereon a gear 55.

The chart 41 is secured against the face of the gear 55 by means of the screw 54 in position to be charted by the pen 40. Mounted in suitable bearings formed on the other end of the protruding support 42 there is a pinion 56 mounted on a shaft 57 supported in the bearing extensions 58. The other end of the shaft 57 is secured to a crank handle 59. Upon the inner end of the spindle 153 there is keyed a driving sleeve 60 having a rearwardly positioned arm 61 extending radially therefrom against which the piston ring abuts, and a forwardly extending arm 62 pivoted thereto by a pin 63 adapted to be moved in or out of position to engage and cause the ring 50 to be embraced between said arm and the arm 61. Said arms are thereupon locked in place after the ring has been properly positioned by means of a screw 64. Said arms 61 and 62 are each provided with a forwardly-extending toe 65, which, together with said arms, are adapted to freely slide along the surface of the ring 50 until they engage the lug 52 at a point intermediate the outer and inner peripheries of said ring.

In operation, the ring is mounted in the cylinder as above described so as to bear against the shoulder 51. The handle 59 is then rotated so as to cause the toes 65 to engage the lug 52, whereupon continued rotation of the handle will cause the piston ring to be rotated within the cylinder. It will be noted that the force applied to the piston ring for rotating the same is directed to a point intermediate the outer and inner peripheries of the ring so as to avoid any component forces being set up which would disturb the proper action and forces to be recorded by the instrument. As shown, the position of the ring against the shoulder is in the plane of the loading bar 23 so that the lower end of said bar is normally engaged by the outer periphery of the ring. Thus any variations in the curvature of the ring or in the outward radial force exerted thereby against the wall of the cylinder will be communicated to the instrument through said loading bar.

The contacts 27 and 30 are finally adjusted with respect to the calibrated spring 18, whereby they will be normally closed when the ring is of proper curvature and of proper tension due to the upper pressure exerted thereby against said loading bar. Such contacts being closed and the switches 44 and 45 being closed, a current will be set up in the electro-magnet which cuts out the resistance 46, and the energizing thereby of the electro-magnet will cause the core 14 to be forced downwardly against the calibrated spring 18, which, in turn, will cause the loading bar to press downwardly against the ring, and through the connection of the spring and core with the link 35 and arm 39, such downward movement will cause the pen 40 to move radially and outwardly with respect to the chart. Providing the outward radial force of the ring is sufficient to withstand the downward pressure exerted thereon by means of the electro-magnet through the spring 18, the pen will move outwardly to the extent of its movement as limited by the lower stop 32. This will indicate on the chart a maximum of radial force exerted by the piston ring. Upon the radial force of the piston ring being overcome, sufficiently to permit a slight collapse or inward movement thereof due to the downward pressure exerted by the electro-magnet through the spring 18, it will allow the loading bar to move downwardly therewith so as to break electrical contact between the points 27 and 30. This will act to cause the current to pass through the resistance 46, which resistance will be sufficient to reduce the energy of the electro-magnet for permitting the spring 18 to force the core upwardly therein and thereby cause the pen 40 to move toward the center of the chart.

In this connection, it might be stated that the only purpose of the rheostat 46 in the circuit is to prevent sudden collapse of the recording pen which would be caused by the complete de-energizing of the electro-magnet. But the resistance is so adjusted as to cause sufficient de-energizing of the electro-magnet to bring the pen to its complete inward position, wherein its movement is stopped by the stop 33, but without the sudden jarring effect that would be created by the breaking of the contact points 27 and 30 if the resistance 46 was not in the circuit. This acts as a bumper or cushion for the mechanism, although the same action, so far as recording, would take effect without the resistance.

If there is a so-called "flat" in the piston ring, or if a portion of it is not of such curvature as to make proper contact with the cylinder wall, the lower end of the loading bar will drop down sufficiently to break the contacts which will show a zero reading upon the chart by reason of the pen being positioned as near as possible to the center thereof.

From the above, it will be noted, that upon rotation of the piston ring, and the simultaneous rotation of the chart 41, there will be substantially radial lines drawn on said chart by the pen 40 which will indicate the extent of the radial force exerted by the ring, effected by the intermittent make and break of the points 27 and 30. If there is a "flat", the adjustment may be such that the contacts will be broken and the pin will be at the zero point during a certain period of rotation. If there is proper curvature and contact, but no radial force exerted, the pressure exerted by the electro-magnet will be almost immediately broken by the breaking of the contact points by reason of the ring permitting the loading bar to promptly force the ring inwardly so that there will be a relatively short movement of the pen from zero, which short movements will continue intermittently during the rotation of the ring throughout such non-force exerting surface. When such portion of the ring is brought into engagement with the loading bar as will have a substantially maximum radial force, the solenoid will be forced downwardly and the spring 18 will be compressed until the pen 40 has moved a substantial distance outwardly on the chart before the downward force overcomes the radial force of the ring and causes the contacts to break and permit the pin to move back again to zero. Such radial movements of the pin will be rapid and intermittent so as to create a large area of wave-like lines, the outer extremities of which will give the proper plot for the radial force of the ring throughout the corresponding peripheral surface thereof, as best illustrated in Fig. 1.

Thus, according to the illustration of Fig. 1, there is charted a ring having areas AB, CD, EF of either flat or no radial force, such as would cause inefficiency of a motor by reason of loss of compression and passage of oil. On the other hand, the chart shown herein indicates that the surfaces DYE, FZA and BXC exert an appreciable radial force, the surface indicated at "Y" showing a maximum radial force. As the chart has been rotated with the ring, it will indicate the exact points or arcs of the ring to which the readings relate.

Whereas, the instrument has been herein shown as particularly adapted for use for a piston ring, it will be apparent that the same arrangement may be applied to an instrument for indicating any variations in curvature, and by providing a suitable supporting housing, other objects may be tested and charted for variations in curvature and spring tension through the variations in movement of the loading bar as applied and forced downwardly against the surface thereof.

The invention claimed is:

1. In a testing instrument, the combination of a support for an article to be tested, means for engaging said article, means intermittently exerting a pressure sufficient to overcome the resisting force of said article, and an electric circuit controlling said intermittent pressure means and controlled by the movement of the article engaging means.

2. In a testing instrument, the combination of a cylindrical support for an article to be tested, means for rotating said article within said cylindrical support, means engaging the article and applying an opposing pressure thereto, and an indicating mechanism controlled by the movement of said engaging means during the rotation of said article with respect thereto for indicating any variations in the surface of said article or radial force exerted thereby.

3. In a testing instrument, the combination of a support for an article to be tested, means for engaging said article and applying an opposing pressure thereto, means for moving said article and engaging means relative to each other, a visual chart, and means controlled by said engaging means for recording the movement thereof on said chart whereby any variations in the surface of said article or the force exerted thereby will be shown.

4. In a testing instrument, the combination of a cylindrical support for an article to be tested, a loading bar extending through the wall of said support in position to engage the bearing surface of said article and exert an opposing pressure thereon, means for rotating said article within said cylinder and with respect to said bar, and an indicating mechanism controlled by the movement of said bar set up by its engagement with said article during its rotation for indicating any variations in the bearing surface or radial force exerted thereby.

5. In a testing instrument, the combination of a support for an article to be tested, a loading bar in position to engage the surface of said article, an electro-magnet fixedly mounted on said support and having a floating core, a calibrated spring positioned intermediate said core and bar, an electric circuit controlled by the movement of said bar for energizing said electro-magnet and causing said spring to be compressed and forced against said article and means for breaking said circuit upon the force of said spring overcoming the force exerted by said article and deflecting the same.

6. In a testing instrument, the combination of a support for an article to be tested, a loading bar in position to engage the surface of said article, an electro-magnet fixedly mounted on said support and having a floating core, a calibrated spring positioned intermediate said core and bar, an electric circuit for energizing said electro-magnet, a contact point mounted on said bar, and a corresponding fixed contact point, said contact points being positioned in said circuit whereby upon its being closed said electro-magnet will be energized for exerting a pressure through said spring upon said bar and article sufficient to overcome the force exerted thereby whereby said article will collapse and cause said contact points to separate and said circuit to be broken.

7. In a testing instrument, the combination of a support for an article to be tested, a loading bar in position to engage the surface of said article, an electro-magnet fixedly mounted on said support and having a floating core, a calibrated spring positioned intermediate said core and bar, an electric circuit for energizing said electro-magnet, a contact point mounted on said bar, a corresponding fixed contact point, said contact points being positioned in said circuit whereby upon its being closed said electro-magnet will be energized for exerting a pressure through said spring upon said bar and article sufficient to overcome the force exerted thereby whereby said article will collapse and cause said contact points to separate and said circuit to be broken, and means operable thereby for indicating the pressure exerted on said article.

8. In a testing instrument, the combination of a support for an article to be tested, means for engaging said article, means for moving said article and engaging-means relative to each other, and an electric circuit controlled by the movement of said engaging-means for exerting a pressure thereon when closed and releasing said pressure when opened by a predetermined extent of movement of said engaging-means.

9. In a testing instrument, the combination of a support for an article to be tested, a loading bar adapted to engage said article and having a contact point thereon, means for moving said article and bar relative to each other, a corresponding fixed contact point, an electric circuit embracing said contact points, a calibrated spring connected with said bar, and means controlled by said circuit for causing said spring to force said bar against the article to be tested until the pressure thereupon is sufficient to permit said bar to move and cause the contact points to be separated for breaking said circuit.

10. In a testing instrument, the combination of a support for an article to be tested, a loading bar adapted to engage said article and having a contact point thereon, means for moving said article and bar relative to each other, a corresponding fixed contact point, an electric circuit embracing said contact points, a calibrated spring connected with said bar, means controlled by said circuit for causing said spring to force said bar against the article to be tested until the pressure thereupon is sufficient to permit said bar to move and cause the contact points to be separated for breaking said circuit, and an indicating mechanism controlled by said spring for indicating the pressure exerted thereby.

11. In a testing instrument, the combination of a support for an article to be tested, a loading bar in position to engage said article, means for moving said article and bar relative to each other, means for exerting a pressure on said bar and against said article, and means controlled by the movement of said bar upon said pressure being increased sufficient to cause said article to give, for causing the release of said pressure.

12. In a testing instrument, the combination of a support for an article to be tested, a loading bar in position to engage said article, means for moving said article and bar relative to each other, means for exerting a pressure on said bar against said article, means controlled by the movement of said bar upon said pressure being increased sufficient to cause said article to give for causing the release of said pressure, and indicating mechanism controlled by said last-mentioned means for registering the extent of the force exerted.

13. In a testing instrument, the combination of a housing in which an article to be tested is adapted to be positioned, means for moving said article with respect to said housing, a loading bar extending into said housing and in engagement with said article, an electro-magnet mounted on said housing, a calibrated spring positioned intermediate said loading bar and the core in said electro-magnet, a contact point mounted on said loading bar, a corresponding contact point supported on said housing, an electric circuit including said contact points and electro-magnet, whereby upon the contact of said points said circuit will be closed for energizing said electro-magnet and applying a force through said spring upon said loading bar and article, and means connected with the core of said electro-magnet for indicating the resistance by said article before the same is caused to be deflected sufficiently to permit the contact points to separate and break said circuit.

14. In a testing instrument, the combination of a support for an article to be tested, means for engaging said article and exerting an opposing pressure thereon, means for rotating said article and engaging means relative to each other, a chart supported in connection with said article and rotatable in synchronism therewith, and an indicating mechanism controlled by said engaging means for indicating on said chart the movement thereof, whereby any variations in the surface of said article or the force exerted thereby will be indicated on corresponding positions on said chart.

15. In a testing instrument, the combination of a cylindrical support for an annular article to be tested, a loading bar extending through the wall of said cylindrical support in contact with the surface of said article and exerting an opposing pressure thereon, means for rotating said article within said support, a chart rotatably mounted on said support and adapted to be rotated in synchronism with said article, and indicating mechanism controlled by said loading bar for recording on said chart during its rotary movement the movement of said bar so as to indicate any variations in the surface of said article or the force exerted thereby.

16. In a testing instrument, the combination of a cylindrical housing on which an annular article to be tested is adapted to be positioned, a chart mounted in connection with said article, means for rotating said chart and article in synchronism and with respect to said housing, a loading bar extending into said housing and in engagement with said article, an electro-magnet mounted on said housing having a floating core, a calibrated spring positioned intermediate said core and bar, an indicating mechanism associated with said spring and core and in position to engage and graph said chart, a contact point mounted on said loading bar, a corresponding contact point supported on said housing, an electric circuit including said contact points and electro-magnet, and a resistance unit positioned in said circuit, whereby upon said contact points being closed said resistance will be shunted and said electro-magnet will be energized for exerting a pressure against said article through said spring and bar until said pressure overcomes the radial force exerted by said article causing said contacts to be broken whereby the current passing through said resistance will cause said electro-magnet to be partially de-energized sufficient to substantially release the pressure exerted thereby, said indicating mechanism graphing the extent of pressure thus exerted on said chart at positions thereon corresponding to said article.

17. The process of measuring an article for variations in contact and spring tension, consisting in mounting said article in a suitable support, moving the article with respect to the support, applying a force-exerting member against the article adapted to make or break an electrical circuit, providing means for exerting a pressure against said member for deflecting said article sufficiently to break said circuit and relieve the pressure exerted on said member, and recording the force required for such deflection of said article.

In witness whereof, I have hereunto affixed my signature.

JOHN H. HOLLOWAY.